Jan. 20, 1942.  D. S. WEISS  2,270,569
COUPLING EYE
Filed Feb. 5, 1940
Fig. 1.
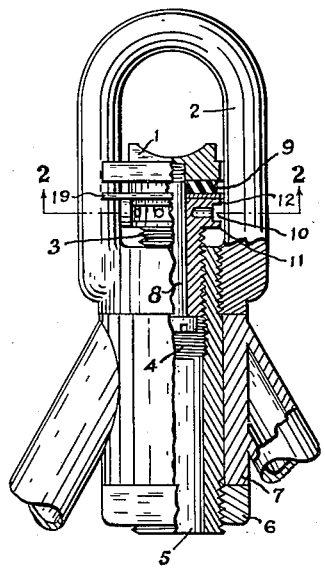
Fig. 2.
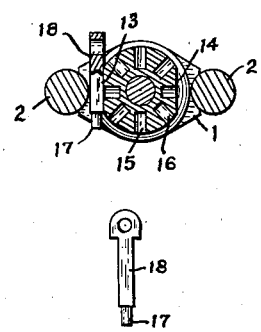
Fig. 3.
Fig. 4.
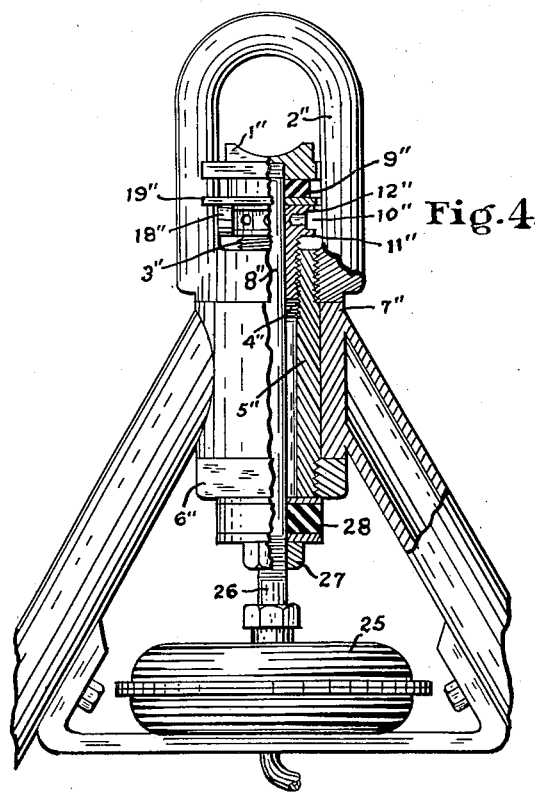
*Inventor:*
Dewey S. Weiss,
By Rudolph B. Prentice
*Attorney.*

Patented Jan. 20, 1942

2,270,569

UNITED STATES PATENT OFFICE 2,270,569

COUPLING EYE

Dewey S. Weiss, Portland, Oreg.

Application February 5, 1940, Serial No. 317,311

2 Claims. (Cl. 280—33.15)

My invention relates to coupling eyes of the general type provided at the end of trailer-tongues to form couplings with a variety of styles of hitches or hooks attached to tractor vehicles, and more particularly to that type thereof having means to adjust the size of the eye aperture to fit hitches wherewith the same is used.

The principal object of my invention is the provision of a coupling eye capable of secure coupling to a hitch in such a manner as to eliminate damaging impacts between the hitch and the eye under the impetus of heavy loads.

Other objects and advantages of my invention will be apparent in the following discourse wherein the significance of the reference characters in the accompanying drawing, details of construction and operation of typical eyes embodying my invention, and the particular advantages thereof are explained.

Figure 1 represents a view of the coupling eye attached to a fragment of a conventional trailer tongue, shown partly in elevation and partly in section.

Figure 2 represents a view of a section taken on the line 2—2 of Figure 1.

Figure 3 represents a view of the face of a locking device shown in its other aspects in Figures 1 and 2.

Figure 4 represents a view of the coupling eye as the same appears when equipped with power actuated elements of a conventional form, shown partly in elevation and partly in section.

The essence of my invention consists in means to render the aperture of a solid, rigid, and integral, eye adjustable within the limits necessary to accommodate hitches of all practical sizes in use and to make secure couplings therewith.

In its elements my invention consists in the use of a slidable element 1 mounted within an integral eye 2 in combination with means to secure the former in adjusted positions.

As is well understood, the hitch attached to any particular tractor vehicle is proportioned to carry such loads as represent the maximum of which the tractor is capable of hauling. It is therefore an advantage to equip a trailer of definite load limit with an eye of such proportions as are best suited to the trailer, but which at the same time may be adjusted for coupling to a tractor hitch of any size, since in practice, a very large tractor is often used to haul a relatively small capacity trailer.

Obviously if a tractor-vehicle-hitch is provided with adjusting means employing strains suited to its maximum load capacity, such strains would be entirely out of proportion for use with a small trailer and would result in excessive wear and stress on the relatively light trailer-eye made to carry light loads. For these reasons it is more practical to apply adjustment provisions to the trailer-eye than to the tractor-hitch.

In that form of trailer-eye shown in Figure 1, a screw-member 3 engages an internal thread 4 in the tube 5 onto which are screwed the nut 6 and integral eye 2 at opposite ends to secure the assembly to the trailer-tongue sleeve 7 of conventional form.

A screw 8 is rotatable within the screw-member 3 and serves to retain a rubber cushion 9 and the throat-piece 1 in proper position with reference to the screw-member 3.

The head of the screw-member 3 is formed with an annular groove 10 between two flanges 11 and 12 in which the surface at the bottom of said groove has the form of two cylindrical segments in opposed relationship connected by two flat surfaces 13 and 14 in symmetrical arrangement as illustrated in Figure 2. A series of radially disposed holes as 15 and 16 are engaged by the end 17 of the key 18 to effect rotation of the screw-member 3 and the latter is locked against rotation by disposing the key 18 between one or the other of the flat surfaces 13 or 14 and one leg of the eye 2 as shown in Figures 1 and 2.

Thus, the throat-piece 1 may be moved into contact with a tractor-hitch engaging the eye 2 with any desirable pressure by operation of the screw-member 3 and the cushion 9, interposed therebetween. A washer 19, slidable upon the legs of the eye 2, receives the thrust of the screw-member 3 and intercepts the transmission of rotary effects to the cushion 9.

In Figure 4 is shown a form of my invention adapted for use with power throat-closing means in the form of a conventional pneumatic thrust device 25 the rod 26 of which supplants the screw 8 of the device as shown in Figure 1 and serves to actuate the throat-piece 1" into proper position for fair coupling when such operation may involve actual movement of a heavily loaded trailer backward to bring the eye 2" into fair engagement with the tractor-hitch.

The screw-member 3" may then be freely turned up as before described with reference to Figure 1 and locked in that position whereat the throat-piece 1 may be held securely in event of a failure of the air supply.

In some cases it may be desirable to run with a constant force applied through the pneumatic means when the screw device will serve as an auxiliary safety device. In such cases, with the air pressure constant, the force exerted upon the tractor-hitch by the throat-piece 1" may be modified to prevent undue abrasive effects by an adjustment of the nut 27 upon the rod 26 by means of which the degree of compression of the cushion 28, and hence the degree of resistance thereof, deductible from the total force of the pneumatic device, may be regulated.

It is not intended that the scope of this invention shall be construed as confined to the particular mechanical devices shown to perform the several functions of the component elements as at first hereinbefore described, but that all mechanical equivalents and expedients apparent to engineering skill to actuate the elements of my invention in the combination of effects described shall be embraced.

I claim:

1. A coupling-eye comprising, an integral eye-piece attachable to a trailer tongue, a throat-piece to regulate the size of the aperture in said eye-piece, pneumatic means to actuate said throat-piece, and auxiliary screw means associated with said throat-piece and said pneumatic means to retain said throat-piece in an adjusted disposition in event of failure of said pneumatic means.

2. A coupling-eye comprising, an integral eye-piece attachable to a trailer tongue, a throat-piece to regulate the size of the aperture in said eye-piece, screw means resiliently associatd with said throat-piece to actuate and retain the latter in adjustment, pneumatic means supplemental to said screw means to effect the movement and retention of said throat-piece in contact with a tractor-hitch, and resilient means acting in opposition to said pneumatic means to regulate the force of the latter.

DEWEY S. WEISS.